US006201069B1

(12) United States Patent
Fukazawa et al.

(10) Patent No.: US 6,201,069 B1
(45) Date of Patent: Mar. 13, 2001

(54) POLYPROPYLENE/PROPYLENE-ETHYLENE COPOLYMER COMPOSITION AND PROCESS FOR THE PREPARATION THEREOF

(75) Inventors: Tooru Fukazawa; Yozo Shimomura; Shunji Kawazoe, all of Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/297,323

(22) PCT Filed: Aug. 28, 1998

(86) PCT No.: PCT/JP98/03855

§ 371 Date: Apr. 29, 1999

§ 102(e) Date: Apr. 29, 1999

(87) PCT Pub. No.: WO99/11684

PCT Pub. Date: Mar. 11, 1999

(30) Foreign Application Priority Data

Aug. 29, 1997 (JP) .................................................. 9-249942

(51) Int. Cl.[7] .............................. C08F 8/00; C08L 9/00; C08L 23/00; C08L 23/04
(52) U.S. Cl. ............................ 525/191; 525/232; 525/240
(58) Field of Search ..................................... 525/191, 232, 525/24

(56) References Cited

U.S. PATENT DOCUMENTS 6,005,034 * 12/1999 Hayashida et al. .................. 524/117

FOREIGN PATENT DOCUMENTS

| 0 276 323 | 8/1988 | (EP) . |
| 0 700 943 | 3/1996 | (EP) . |
| 0 751 160 | 1/1997 | (EP) . |
| 0 790 262 | 8/1997 | (EP) . |
| 5-117342 | 5/1993 | (JP) . |
| 8-59766 | 3/1996 | (JP) . |

* cited by examiner

*Primary Examiner*—Nathan M. Nutter
(74) *Attorney, Agent, or Firm*—Leydig, Voit & Mayer, Ltd.

(57) ABSTRACT

An object of this invention is to provide a polypropylene/propylene-ethylene copolymer composition having an excellent balance among rigidity, toughness, impact resistance, etc.

This invention provides a polypropylene/propylene-ethylene copolymer composition having a melt flow rate of from 1 to 80 g/10 min obtained by producing a specific propylene polymer in an amount of from 60 to 95% by weight based on the total amount of the composition to be finally obtained and subsequently producing in a second stage (polymerization step (II)) a specific propylene-ethylene copolymer in an amount of from 5 to 40% by weight based on the total amount of the composition to be finally obtained. A process for producing the composition is also provided.

7 Claims, No Drawings

POLYPROPYLENE/PROPYLENE-ETHYLENE COPOLYMER COMPOSITION AND PROCESS FOR THE PREPARATION THEREOF

This is a national phase of International Application No. PCT/JP98/03855, filed Aug. 28, 1998, which claims priority to the Japanese Patent Application No. 9-249942, filed Aug. 29, 1997.

TECHNICAL FIELD

The present invention relates to a composition comprising polypropylene and a propylene-ethylene copolymer (hereinafter referred to as "polypropylene/propylene-ethylene copolymer composition") and a process for producing the same. More particularly, this invention relates to a polypropylene/propylene-ethylene copolymer composition having an excellent balance among rigidity, toughness, impact resistance, etc., and to a process for producing the same.

BACKGROUND ART

Polypropylene resins have conventionally been used in a wide variety of fields because they are relatively inexpensive and have excellent properties. However, there has been a desire for an improvement in impact resistance, in particular, low-temperature impact resistance. Many techniques for eliminating this problem have been proposed so far. A generally employed technique is to produce a propylene block copolymer by firstly forming a propylene homopolymer ingredient and then incorporating an ethylene-propylene random copolymer ingredient. Compared to propylene polymers, propylene block copolymers are inferior in rigidity, hardness, and heat resistance although improved in impact resistance.

Among techniques which have been proposed for mitigating these drawbacks is a method in which the ratio of the melt flow rate of a first-stage polymer to that of a second-stage polymer is regulated as described in Unexamined Published Japanese Patent Application No. 5-117342. This method is in extensive use in various industrial fields such as the fields of motor vehicles and domestic electrical appliances.

However, even the above-described technique according to Unexamined Published Japanese Patent Application No. 5-117342 has still had an insufficient balance among rigidity, toughness, impact resistance, etc.

An object of the present invention is to provide a polypropylene/propylene-ethylene copolymer composition excellent in rigidity, toughness, and impact strength and to further provide a process for producing the same.

In view of the problems described above, the present inventors made intensive studies in order to obtain an improved balance between rigidity and toughness/impact resistance in propylene-ethylene block copolymers. As a result, it has been found that a polypropylene/propylene-ethylene copolymer composition excellent in rigidity, toughness, and impact strength is obtained by yielding a propylene-ethylene copolymer composition through two-stage polymerization in such a manner that a polypropylene having a tie molecule volume content ($\beta$) of 1.38% or higher is produced as a product of the first stage and a propylene-ethylene copolymer is yielded, in the second stage, around the polypropylene yielded in the first stage. The present invention has thus been completed.

DISCLOSURE OF THE INVENTION

That is, the invention for which a patent is claimed is as follows.

(1) A polypropylene/propylene-ethylene copolymer composition having a melt flow rate (ASTM D-1238; the same applies hereinafter) of from 1 to 80 g/10 min obtained through:

a first stage (polymerization step (I)) in which propylene is polymerized in the presence of a highly stereoregular catalyst and hydrogen to produce a propylene polymer having a melt flow rate in the range of from 15 to 99 g/10 min and a tie molecule volume content ($\beta$), as obtained from an oriented sample and defined by $$\beta = (1 - 0.01 X_c) E / (41 - 0.01 X_c \cdot E)$$

wherein Xc: degree of crystallization (%); and
E (GPa): modulus of elasticity, of 1.38% or higher in an amount of from 60 to 95% by weight based on the total amount of the composition to be finally obtained; and a second stage (polymerization step (II)) in which ethylene and propylene are subsequently fed to the product of the first stage in such a proportion as to result in an ethylene content of from 20 to 80% by weight to produce a propylene-ethylene copolymer in an amount of from 5 to 40% by weight based on the total amount of the composition to be finally obtained.

(2) The polypropylene/propylene-ethylene copolymer composition as described in the above (1), wherein the common logarithm of the ratio of the melt flow rate of the propylene polymer obtained in polymerization step (I) (MFR (i)) to the melt flow rate of the propylene-ethylene copolymer obtained in polymerization step (II) (MFR (ii)), i.e., the common logarithm of MFR (i)/MFR (ii), is from 2 to 9.

(3) The polypropylene/propylene-ethylene copolymer composition as described in the above (1), wherein the common logarithm of the ratio of the melt flow rate of the propylene polymer obtained in polymerization step (I) (MFR (i)) to the melt flow rate of the propylene-ethylene copolymer obtained in polymerization step (II) (MFR (ii)), i.e., the common logarithm of MFR (i)/MFR (ii), is from 4 to 7.

(4) The polypropylene/propylene-ethylene copolymer composition as described in the above (1), which has a melt flow rate of from 20 to 30 g/10 min.

(5) The polypropylene/propylene-ethylene copolymer composition as described in the above (1), which has a melt flow rate of from 40 to 80 g/10 min.

(6) The polypropylene/propylene-ethylene copolymer composition as described in the above (1), wherein the propylene polymer is a propylene polymer which consists of repeating units represented by the following general formula (1) and has a number-average molecular weight of from 10,000 to 60,000, a density of from 0.90 to 0.92 g/cm³, and a tie molecule volume content ($\beta$) of 1.38% or higher.

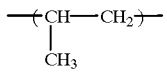

(1)

(7) A process for producing a polypropylene/propylene-ethylene copolymer composition having a melt flow rate (ASTM D-1238; the same applies hereinafter) of from 1 to 80 g/10 min which comprises:

a first stage (polymerization step (I)) in which a highly stereoregular catalyst is used to polymerize propylene in the presence of the highly stereoregular catalyst and hydrogen to produce a propylene polymer having a melt flow rate in the range of from 15 to 99 g/10 min and a tie molecule volume content (β), as obtained from an oriented sample and defined by $$\beta=(1-0.01Xc)E/(41-0.01Xc\cdot E)$$

wherein Xc: degree of crystallization (%); and E (GPa): modulus of elasticity, of 1.38% or higher in an amount of from 60 to 95% by weight based on the total amount of the composition to be finally obtained; and a second stage (polymerization step (II)) in which ethylene and propylene are subsequently fed to the product of the first stage in such a proportion as to result in an ethylene content of from 20 to 80% by weight to produce a propylene-ethylene copolymer in an amount of from 5 to 40% by weight based on the total amount of the composition to be finally obtained.

BEST MODES FOR CARRYING OUT THE INVENTION

The present invention is explained in detail below.

The polymerization step (I) in the present invention is conducted in such a manner that the resultant propylene polymer has a melt flow rate (MFR (i)) in the range of from 15 to 99 g/10 min, preferably from 30 to 99 g/10 min, and a tie molecule volume content (β) of 1.38% or higher.

The value of β is determined according to the method proposed by Masaru Ishikawa et al. in *Polymer.*, Vol.37, No.24, 5375–5379(1996). Specifically, the following method was used.

To 100 parts by weight of a virgin polymer were added 0.1 part by weight of IRGANOX 1010 (tetrakis[methylene-3-(3',5'-dibutyl-4'-hydroxyphenyl)propionate]methane) (manufactured by Ciba-Geigy Ltd.) as a phenolic heat stabilizer and 0.1 part by weight of calcium stearate. These ingredients were mixed together at room temperature for 2 minutes using a high-speed agitation type mixer (e.g., a Henschel mixer, trade name), and this mixture was granulated at 200° C. with an extrusion granulator having a screw diameter of 40 mm. Subsequently, the granules were heated with a pressing machine for 3 minutes under the conditions of a molten-resin temperature of 230° C. and 4 MPa, subsequently cooled for 3 minutes under the conditions of 30° C. and 14.8 MPa, and then taken out of the mold to obtain a compression-molded sheet having a thickness of 0.5 mm. A strip having a length of 50 mm and a width of 6 mm was punched out of the compressed sheet to obtain a test piece. Using Toyo Seiki Strograph, the test piece was stretched at 40° C. and a displacement rate of 10 mm/min in the longitudinal direction in a stretch ratio of 7 times the chuck distance (10 mm). The stretched test piece after the pulling was cut at its neck part with scissors. Subsequently, the thickness (a) and width (b) of the cut piece were measured. The test piece was stretched again at 40° C. and a displacement rate of 10 mm/min in the longitudinal direction to measure the modulus of elasticity E (GPa). Furthermore, 10 mg of the cut test piece which had undergone the 7-time stretching was placed in a differential scanning calorimeter (DSC Type 109, manufactured by E. I. du Pont de Nemours and Co.) and heated at a heating rate of 20° C./min and the degree of crystallization Xc (%) was determined from a peak appearing in the resultant thermogram.

The modulus of elasticity E and the degree of crystallization Xc (%) obtained in the above measurement were incorporated into the following equation to determine the tie molecule volume content β.

$$\beta=(1-0.01Xc)E/(41(GPa)-0.01Xc\cdot E)$$

If the value of β of the polymer yielded in polymerization step (I) is below 1.38%, molded articles have reduced toughness. If the MFR (i) thereof is lower than 15 g/10 min, the polymer has reduced melt flowability. If it exceeds 99 g/10 min, the polymer has reduced toughness.

The propylene polymer in the polypropylene/propylene-ethylene copolymer composition of the present invention is preferably a propylene polymer which consists of repeating units represented by the following general formula (1) and has a number-average molecular weight of from 10,000 to 60,000, a density of from 0.90 to 0.92 g/cm³ and a tie molecule volume content (β) of 1.38% or higher.

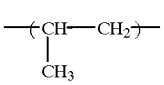

(1)

Number-average molecular weights of the propylene polymer lower than 10,000 are undesirable in that impact resistance is reduced, while number-average molecular weights thereof exceeding 60,000 are undesirable in that flowability is reduced. Furthermore, densities thereof lower than 0.90 g/cm³ are undesirable in that products have reduced rigidity, while densities exceeding 0.92 g/cm³ are undesirable in that products have reduced impact resistance.

In polymerization step (II), a propylene-ethylene copolymer part is formed by the copolymerization of propylene with ethylene. This copolymer has an ethylene content of from 20 to 80% by weight, more preferably from 35 to 55% by weight. Ethylene contents thereof outside the above range are undesirable in that the polymer obtained has reduced impact resistance.

The polypropylene/propylene-ethylene copolymer composition of the present invention comprises the propylene polymer yielded in polymerization step (I) and the propylene-ethylene copolymer yielded in polymerization step (II). In the composition, the proportion of the polymer yielded in polymerization step (I) is from 60 to 95% by weight and that of the copolymer yielded in polymerization step (II) is from 5 to 40% by weight. If the proportion of the propylene polymer yielded in polymerization step (I) is below 60% by weight, products have reduced rigidity. If the proportion thereof exceeds 95% by weight, the improvement in low-temperature impact strength is insufficient.

The polypropylene/propylene-ethylene copolymer composition of the present invention has a melt flow rate (amount of the molten resin discharged in 10 minutes at 230° C. under a load of 2.16 kg; hereinafter abbreviated as MFR) of from 1 to 80 g/10 min. The MFR range in which rigidity is most balanced with impact resistance is from 20 to 30 g/10 min. However, for applications where moldability is especially important, the range of the MFR of the composition is preferably from 40 to 80 g/10 min.

The polypropylene/propylene-ethylene copolymer composition of the present invention has an excellent balance among mechanical strengths, in particular, between rigidity and toughness/impact resistance, and is suitable for use as an injection-molding or extrusion-molding resin.

Examples of the catalyst for use in polymerization steps (I) and (II) in producing the polypropylene/propylene-ethylene copolymer composition of the present invention include a highly stereoregular catalyst obtained from a solid catalyst component comprising magnesium, titanium, a halogen, and a polycarboxylic acid ester and from an organoaluminum compound and an electron-donating compound (e.g., Unexamined Published Japanese Patent Applications Nos. 3-220207 and 4-103604) and a highly stereoregular catalyst system obtained using any of the metallocene compounds shown below. However, usable catalysts are not limited to these.

Examples of the metallocene compounds include chiral transition metal compounds represented by the following general formula (2) and aluminoxane compounds.

$$Q(C_5H_{4-m}R^1_m)(C_5H_{4-n}R^2_n)MXY \qquad (2)$$

(In the formula, $(C_5H_{4-m}R^1_m)$ and $(C_5H_{4-n}R^2_n)$ each represents a substituted cyclopentadienyl group; m and n each is an integer of 1 to 3; and $R^1$ and $R^2$ may be the same or different and each represents a hydrocarbon group having 1 to 20 carbon atoms, a silicon-containing hydrocarbon group, or a hydrocarbon group bonded to two carbon atoms of the cyclopentadienyl ring to form one or more hydrocarbon rings optionally substituted with one or more hydrocarbons. Q is a hydrocarbon group, an unsubstituted silylene group, or a hydrocarbon-substituted silylene group each having a valence of 2 and crosslinking the $(C_5H_{4-m}R^1_m)$ to the $(C_5H_{4-n}R^2_n)$. M represents a transition metal selected from titanium, zirconium, and hafnium, and X and Y may be the same or different and each represents hydrogen, a halogen, or a hydrocarbon group.)

Examples of the metallocene compounds represented by general formula (2) described above include dimethylsilylene(3-t-butylcyclopentadienyl)(fluorenyl)-zirconium dichloride, dimethylsilylene(3-t-butylcyclopentadienyl) (fluorenyl)hafnium dichloride, rac-ethylenebis-(indenyl)zirconium dimethyl, rac-ethylenebis(indenyl)-zirconium dichloride, rac-dimethylsilylenebis(indenyl)-zirconium dimethyl, rac-dimethylsilylenebis(indenyl) zirconium dichloride, rac-ethylenebis (tetrahydroindenyl) zirconium dimethyl, rac-ethylenebis(tetrahydroindenyl) zirconium dichloride, rac-dimethylsilylenebis (tetrahydroindenyl)-zirconium dimethyl, rac-dimethylsilylenebis(tetrahydro-indenyl)zirconium dichloride, rac-dimethylsilylenebis(2-methyl-4,5,6,7-tetrahydroindenyl)zirconium dichloride, rac-dimethylsilylenebis(2-methyl-4,5,6,7-tetrahydroindenyl)-zirconium dimethyl, rac-ethylenebis(2-methyl-4,5,6,7-tetrahydroindenyl)hafnium dichloride, rac-dimethyl-silylenebis(2-methyl-4-phenylindenyl)zirconium dichloride, rac-dimethylsilylenebis(2-methyl-4-phenylindenyl) zirconium dimethyl, rac-dimethylsilylenebis(2-methyl-4-phenylindenyl)-hafnium dichloride, rac-dimethylsilylenebis (2-methyl-4-naphthylindenyl)zirconium dichloride, rac-dimethylsilylene-bis(2-methyl-4-naphthylindenyl) zirconium dimethyl, rac-dimethylsilylenebis (2-methyl-4-naphthylindenyl)hafnium dichloride, rac-dimethylsilylenebis(2-methyl-4,5-benzoindenyl)zirconium dichloride, rac-dimethylsilylenebis(2-methyl-4,5-benzoindenyl)zirconium dimethyl, rac-dimethyl-silylenebis (2-methyl-4,5-benzoindenyl)hafnium dichloride, rac-dimethylsilylenebis(2-ethyl-4-phenylindenyl)zirconium dichloride, rac-dimethylsilylenebis(2-ethyl-4-phenylindenyl)-zirconium dimethyl, rac-dimethylsilylenebis(2-ethyl-4-phenylindenyl)hafnium dichloride, rac-dimethylsilylenebis(2-methyl-4,6-diisopropylindenyl)zirconium dichloride, rac-dimethylsilylenebis(2-methyl-4,6-diisopropylindenyl) zirconium dimethyl, rac-dimethylsilylenebis(2-methyl-4,6-diisopropylindenyl)hafnium dichloride, dimethylsilylene(2,4-dimethylcyclopentadienyl) (3',5'-dimethylcyclopentadienyl)-titanium dichloride, dimethylsilylene(2,4-dimethylcyclopenta-dienyl) (3',5'-dimethylcyclopentadienyl)zirconium dichloride, dimethyl-silylene (2,4-dimethylcyclopentadienyl) (3',5'-dimethylcyclopentadienyl)zirconium dimethyl, dimethylsilylene(2,4-dimethylcyclopentadienyl) (3',5'-dimethylcyclopentadienyl)hafnium dichloride, dimethylsilylene(2,4-dimethylcyclopentadienyl) (3',5'-dimethylcyclopentadienyl)hafnium dimethyl, dimethylsilylene-(2,3,5-trimethylcyclopentadienyl)(2',4',5'-trimethylcyclo-pentadienyl) titanium dichloride, dimethyl-silylene (2,3,5-trimethylcyclopentadienyl)(2',4',5'-trimethylcyclopentadienyl) zirconium dichloride, dimethylsilylene(2,3,5-trimethylcyclopentadienyl) (2',4',5'-trimethylcyclopentadienyl)zirconium dimethyl, dimethylsi-lylene (2,3,5-trimethylcyclopentadienyl)(2',4',5'-trimethylcyclopentadienyl)hafnium dichloride, and dimethylsilylene(2,3,5-trimethylcyclopentadienyl) (2',4',5'-trimethylcyclopenta-dienyl)hafnium dimethyl.

Especially preferred among these are the halogenated hafnium compounds and the halogenated zirconium compounds. Most preferred are the halogenated hafnium compounds.

A typical method for synthesizing dimethylsilylene(2,4-dimethylcyclopentadienyl)(3',5'-dimethylcyclopentadienyl) hafnium dichloride as an example of such metallocene compounds is as follows. Namely, dimethylsilylene(2,4-dimethylcyclopentadienyl)(3',5'-dimethylcyclopentadienyl) sodium is reacted with dichlorodimethylsilane to obtain dimethylsilylene(2,4-dimethylcyclopentadienyl)(3',5'-dimethylcyclopentadienyl)-silane, which is reacted with hafnium tetrachloride, whereby dimethylsilylene(2,4-dimethylcyclopentadienyl)(3',5'-dimethylcyclopentadienyl) hafnium dichloride can be obtained.

Although propylene and ethylene are used as starting materials in producing the polypropylene/propylene-ethylene copolymer composition of the present invention, it is possible to use other α-olefins, unconjugated dienes, and the like according to need in such an amount as not to defeat the object of the present invention.

Polymerization step (I) is a step in which a highly crystalline propylene homopolymer having a high melt flow rate is produced, while polymerization step (II) is a step in which a propylene-ethylene copolymer having a low melt flow rate is produced. These polymerizations may be conducted either continuously or batchwise. Namely, polymerization step (I) and polymerization step (II) may be carried out successively in the same system. Alternatively, use may be made of a method in which the polypropylene obtained in polymerization step (I) is separated and ethylene and propylene are fed thereto, together with or without adding a fresh catalyst, to conduct polymerization step (II) so as to react these monomers with the polypropylene.

In carrying out polymerization step (I), use can be made of slurry polymerization in which propylene is polymerized in a hydrocarbon solvent, e.g., n-hexane, n-heptane, n-octane, benzene, or toluene, bulk polymerization which is conducted in liquefied propylene, and vapor-phase polymerization. In the case of slurry polymerization in polymerization step (I), the polymerization temperature is from 20 to 90° C., preferably from 50 to 80° C., and the polymerization pressure is from 0 to 5 MPa. In the case of vapor-phase polymerization, the polymerization temperature is from 20 to 150° C. and the polymerization pressure is from 0.2 to 5 MPa.

In each of slurry polymerization and vapor-phase polymerization, polymerization step (II) is carried out at a polymerization temperature of from 20 to 80° C., preferably from 40 to 70° C., and a pressure of from 0 to 5 MPa. Ethylene and propylene are fed and copolymerized while regulating the feed proportion of ethylene so that the product of the second stage (polymerization step (II)) has an ethylene content of from 20 to 80% by weight.

Hydrogen is used for molecular-weight control. In polymerization step (I), an elevated hydrogen concentration is preferred (e.g., the hydrogen/propylene concentration ratio (molar ratio) is 0.15 or higher) so as to obtain a polymer having a high melt flow rate. In polymerization step (II), an exceedingly low hydrogen concentration (e.g., 1 mol % or lower) or a hydrogen-free state is preferred so as to obtain a copolymer having a low melt flow rate.

The common logarithm of the ratio of the melt flow rate of the polymer obtained in polymerization step (I) (MFR (i)) to the melt flow rate of the polymer obtained in polymerization step (II) (MFR (ii)), i.e., the common logarithm of MFR (i)/MFR (ii), is preferably from 2 to 9. The value of this logarithm is preferably 2 or larger from the standpoint of obtaining desirable toughness, flexural modulus, and Izod impact strength, and is 9 or smaller from the standpoint of stable production. The more preferred range of the value is from 4 to 8. By regulating the value to 4 or larger, more satisfactory toughness, flexural modulus, and Izod impact strength are obtained. The most preferred range is from 4 to 7. By regulating the value to 7 or smaller, more stable production conditions are obtained.

As long as the effects of the present invention are not lessened, the polypropylene/propylene-ethylene block copolymer composition of the present invention can be used as a mixture thereof with an ordinary crystalline polypropylene polymer, i.e., a crystalline polypropylene homopolymer outside the scope of the present invention, a lowly crystalline or crystalline random copolymer or crystalline block copolymer of propylene and one or more α-olefins such as ethylene, butene-1, pentene-1, hexene-1, and octene-1 which copolymer contains at least 70 wt % propylene units, a copolymer of propylene and either vinyl acetate or an acrylic ester or a saponification product obtained from the copolymer, a copolymer of propylene and an unsaturated silane compound, a copolymer of propylene and either an unsaturated carboxylic acid or its anhydride or a derivative of the copolymer, e.g., a product of the reaction of the copolymer with a metal ion compound, a modified polypropylene polymer obtained by modifying a crystalline polypropylene polymer with either an unsaturated carboxylic acid or a derivative thereof, a silane-modified polypropylene polymer obtained by modifying a crystalline polypropylene polymer with an unsaturated silane compound, etc.

Furthermore, the composition of the invention can be used as a mixture thereof with any of various elastomers (e.g., lowly crystalline ethylene-propylene random copolymers, noncrystalline ethylene-propylene-unconjugated diene terpolymers, lowly crystalline ethylene-butene-1 random copolymers, lowly crystalline propylene-butene-1 random copolymers, lowly crystalline ethylene-hexene-1 random copolymers, lowly crystalline ethylene-octene-1 random copolymers, noncrystal line ethylene-propylene random copolymers, noncrystalline ethylene-butene-1 random copolymers, noncrystalline propylene-butene-1 random copolymers, noncrystalline ethylene-hexene-1 random copolymers, noncrystalline ethylene-octene-1 random copolymers, polybutadiene, polyisoprene, polychloroprene, chlorinated polyethylene, chlorinated polypropylene, fluororubbers, styrene-butadiene rubbers, acrylonitrile-butadiene rubbers, styrene/butadiene/styrene block copolymers, styrene/isoprene/styrene block copolymers, hydrogenated (styrene/1,4-butadiene-1,2-butadiene/styrene) block copolymers, hydrogenated (styrene/isoprene/styrene) block copolymers, hydrogenated (styrene/1,4-butadiene-isoprene/styrene) block copolymers, hydrogenated (styrene/1,4-butadiene-1,2-butadiene-isoprene/styrene) copolymers, hydrogenated (styrene/1,4-butadiene-1,2-butadiene) block copolymers, hydrogenated (styrene/1,2-butadiene-isoprene) copolymers, hydrogenated (styrene/isoprene) block copolymers, ethylene/ethylene-butylene/ethylene block copolymers, ethylene/ethylene-butylene block copolymers, ethylene/propylene-butylene/ethylene block copolymers, ethylene/ethylene-propylene/ethylene block copolymers, ethylene/ethylene-propylene block copolymers, styrene/ethylene-butylene/ethylene block copolymers, and styrene/ethylene-propylene/ethylene block copolymers) or thermoplastic synthetic resins (e.g., polyolefins other than crystalline propylene polymers, such as ultralow-density polyethylene, low-density polyethylene, linear low-density polyethylene, medium-density polyethylene, high-density polyethylene, ultrahigh-molecular polyethylene, noncrystalline ethylene/cycloalkene copolymers (e.g., noncrystalline ethylene/tetracyclododecene copolymers), polybutene, and poly(4-methylpentene), atactic polystyrene, syndiotactic polystyrene, styrene-acrylonitrile copolymers, acrylonitrile/butadiene-styrene copolymers, methacrylic/butadiene/styrene copolymers, polyamides, poly(ethylene terephthalate), poly(butylene terephthalate), poly(ethylene naphthalate), poly(butylene naphthalate), polycarbonates, poly(vinyl chloride), fluororesins, petroleum resins (e.g., petroleum resins having a softening point of from 80 to 200° C., such as $C_5$ petroleum resins, hydrogenated $C_5$ petroleum resins, $C_9$ petroleum resins, hydrogenated $C_9$ petroleum resins, $C_5$–$C_9$ copolymer petroleum resins, hydrogenated $C_5$–$C_9$ copolymer petroleum resins, and acid-modified $C_9$ petroleum resins), DCPD resins (e.g., DCPD resins having a softening point of from 80 to 200° C., such as cyclopentadiene-based petroleum resins, hydrogenated cyclopentadiene-based petroleum resins, cyclopentadiene-$C_9$ copolymer petroleum resins, hydrogenated cyclopentadiene-$C_9$ copolymer petroleum resins, cyclopentadiene-$C_5$–$C_9$ copolymer petroleum resins, and hydrogenated cyclopentadiene-$C_5$–$C_9$ copolymer petroleum resins), etc.).

Various additives ordinarily added to crystalline propylene polymers can also be used in the composition of the present invention as long as the use thereof does not defeat the object of the invention. Examples thereof include antioxidants such as the phenol, thioether, and phosphorus compound types, light stabilizers, heavy-metal deactivators (copper inhibitors), clarifiers, nucleating agents, lubricants, antistatic agents, antifogging agents, antiblocking agents, antidripping agents, free-radical generators such as peroxides, flame retardants, flame retardant aids, pigments, halogen scavengers, dispersants or neutralizing agents such as metal soaps, organic and inorganic antibacterial agents, inorganic fillers (e.g., mica, wollastonite, zeolites, bentonite, perlite, diatomaceous earth, asbestos, calcium carbonate, magnesium carbonate, magnesium hydroxide, hydrotalcites, silicon dioxide, titanium dioxide, zinc oxide, magnesium oxide, calcium oxide, aluminum silicate, glass fibers, potassium titanate, carbon fibers, carbon black, graphite, and metal fibers), and the aforementioned inorganic fillers or organic fillers (e.g., wood meals, pulps, waste papers, synthetic papers, and natural fibers) which have been surface-treated with a surface-treating agent such as a coupling agent (e.g., the silane, titanate, boron compound, aluminate, or zircoaluminate type).

The composition of the present invention can be obtained, for example, by mixing the polypropylene/propylene-ethylene copolymer for use in the present invention with given amounts of aforementioned various additives for addition to ordinary crystalline propylene polymers using an ordinary mixing apparatus, e.g., a Henschel mixer (trade name), supermixer, ribbon blender, or Banbury mixer, and melting and kneading the mixture with an ordinary single-screw extruder, twin-screw extruder, Brabender, rolls, or the like at a melt-kneading temperature of from 170° C. to 300° C., preferably from 190° C. to 250° C., more preferably from 190° C. to 220° C., followed by pelletizing. The composition obtained is subjected to production of desired molded articles by any of various molding methods such as injection molding, extrusion molding, and blow molding.

EXAMPLES

The present invention will be explained in greater detail by reference to the following Examples according to the invention and Comparative Examples. Properties of the compositions obtained were determined by the following methods.

(1) Melt Flow Rate

In accordance with ASTM D-1238 (unit: g/10 min), measurement was made at a temperature of 230° C. under a load of 2.16 kg.

(2) Tie Molecule Volume Content ($\beta$)

In polymerization step (I), the value of $\beta$ was determined according to the method proposed by Masaru Ishikawa et al. in *Polymer*, Vol.37, No.24, 5375–5379(1996). Specifically, the following method was used.

To 100 parts by weight of a virgin polymer were added 0.1 part by weight of IRGANOX 1010 (tetrakis [methylene-3-(3',5'-dibutyl-4'-hydroxyphenyl) propionate]methane) (manufactured by Ciba-Geigy Ltd.) as a phenolic heat stabilizer and 0.1 part by weight of calcium stearate. These ingredients were mixed together at room temperature for 2 minutes using a high-speed agitation type mixer (e.g., a Henschel mixer, trade name), and this mixture was granulated at 200° C. with an extrusion granulator having a screw diameter of 40 mm. Subsequently, the granules were heated with a pressing machine for 3 minutes under the conditions of a molten-resin temperature of 230° C. and 4 MPa, subsequently cooled for 3 minutes under the conditions of 30° C. and 14.8 MPa, and then taken out of the mold to obtain a compression-molded sheet having a thickness of 0.5 mm. A strip having a length of 50 mm and a width of 6 mm was punched out of the compressed sheet to obtain a test piece. Using Toyo Seiki Strograph, the test piece was stretched at 40° C. and a displacement rate of 10 mm/min in the longitudinal direction in a stretch ratio of 7 times the chuck distance (10 mm). The stretched test piece after the pulling was cut at its neck part with scissors.

Subsequently, the thickness (a) and width (b) of the cut piece were measured. The test piece was stretched again at 40° C. and a displacement rate of 10 mm/min in the longitudinal direction to measure the modulus of elasticity E (GPa). Furthermore, 10 mg of the cut test piece which had undergone the 7-time stretching was placed in a differential scanning calorimeter (DSC Type 109, manufactured by E. I. du Pont de Nemours and Co.) and heated at a heating rate of 20° C./min and the degree of crystallization Xc (%) was determined from a peak appearing in the resultant thermogram.

The modulus of elasticity E and the degree of crystallization Xc (%) obtained in the above measurement were incorporated into the following equation to determine the tie molecule volume content $\beta$.

$$\beta=(1-0.01Xc)E/(41(GPa)-0.01Xc \cdot E)$$

(3) Ethylene Content of Propylene-Ethylene Copolymer

Copolymers were produced beforehand by reacting propylene with ethylene in various proportions, and calibration curves were formed from infrared absorption spectra using these copolymers as standard samples. The ethylene content of a whole polymer and the ethylene content of the propylene-ethylene copolymer were determined from infrared absorption spectra using the calibration curves. The ethylene content of the whole polymer was determined from the IR absorption at 720 cm$^{-1}$, while the ethylene content of the propylene-ethylene copolymer was determined from the ratio of IR absorption at 720 cm$^{-1}$ to IR absorption at 730 cm$^{-1}$.

(4) Weight Ratio of Polymer of Polymerization Step (I) to Polymer of Polymerization Step (II)

Using values of the above-described ethylene contents of the whole polymer and of the propylene-ethylene copolymer, the ratio of the weight of the polymer yielded in polymerization step (I) to that of the polymer yielded in polymerization (II) was determined.

$$A=(B/C)\times100$$

A: Weight of propylene-ethylene copolymer in whole polymer

B: Ethylene content of whole polymer

C: Ethylene content of propylene-ethylene copolymer (5) Rigidity

Rigidity was evaluated through a bending test in the following manner. Test pieces having a length of 100 mm, a width of 10 mm, and a thickness of 4 mm were formed from pellets of an obtained copolymer composition using an injection molding machine at a cylinder temperature of 210° C. and a mold temperature of 40° C. The flexural modulus of these test pieces was measured (in accordance with JISK 7203) to evaluate the rigidity. Materials having a high flexural modulus have high rigidity.

(6) Impact Resistance

Impact resistance was evaluated through an Izod impact test in the following manner. Test pieces having a length of 63.5 mm, a width of 13 mm, and a thickness of 3.5 mm (with a notch) were formed from pellets of an obtained copolymer composition using an injection molding machine at a cylinder temperature of 210° C. and a mold temperature of 40° C. The Izod impact strength of these test pieces was measured at 23° C. (in accordance with JISK 7110) to evaluate the impact resistance. Materials having a high Izod impact strength have excellent impact resistance.

Example 1 a) Preparation of Catalyst

A mixture of 150 g of magnesium ethoxide, 275 ml of 2-ethylhexyl alcohol, and 300 ml of toluene was stirred in a 0.3 MPa carbon dioxide atmosphere at 93° C. for 3 hours. Thereto were further added 400 ml of toluene and 400 ml of n-decane. The resultant solution is hereinafter referred to as magnesium carbonate solution.

100 ml of toluene was stirred together with 30 ml of chlorobenzene, 9 ml of tetraethoxysilane, 8.5 ml of titanium tetrachloride, and 100 ml of Isopar G (isoparaffinic hydrocarbons having 10 carbon atoms on the average; boiling points, 156–176° C.) at 30° C. for 5 minutes. Thereto was added 50 ml of the magnesium carbonate solution.

After the resultant mixture was stirred for 5 minutes, 22 ml of tetrahydrofuran was added and this mixture was stirred at 60° C. for 1 hour. Stirring was stopped and the supernatant was removed. Thereafter, the solid yielded was washed with 50 ml of toluene. To the solid obtained were added 100 ml of chlorobenzene and 100 ml of titanium tetrachloride. This mixture was stirred at 135° C. for 1 hour.

Stirring was stopped and the supernatant was removed. Thereafter, 250 ml of chlorobenzene, 100 ml of titanium tetrachloride, and 2.1 ml of di-n-butyl phthalate were added to the residue, and the resultant mixture was stirred at 135° C. for 1.5 hours.

The supernatant was removed, and the residual solid was washed successively with 600 ml of toluene, 800 ml of Isopar G, and 400 ml of hexane to collect a solid catalyst component. This solid catalyst component had a composition comprising 2.3 wt % titanium, 55 wt % chlorine, 17 wt % magnesium, and 7.5 wt % di-n-butyl phthalate.

b) Preparation of Pre-activated Catalyst

The atmosphere in a stainless-steel reactor having a capacity of 50 liters and equipped with inclined blades was replaced with nitrogen gas. Thereafter, 40 liters of n-hexane was introduced thereinto, and 75 g of the solid product and 13 g of triethylaluminum were added at room temperature. Subsequently, 100 g of propylene was fed over 120 minutes. The propylene remaining unreacted was removed to obtain a slurry of a pre-activated catalyst.

c) Polymerization Step (I)

To a 200-liter first polymerizer were continuously fed propylene at a rate of 7 kg/hr, n-hexane at 26 l/hr, triethylaluminum at 8.9 g/hr, and diisopropyldimethoxysilane as an organosilicon compound at 6.9 g/hr. The pre-activated slurry was added thereto (400 ml/hr) so as to result in an internal temperature of 70° C. and a total pressure of 0.8 MPa. Propylene and hydrogen were fed to conduct polymerization while keeping the hydrogen/propylene concentration ratio in the vapor phase at 0.24. Thereafter, the polymerization slurry was fed to a second polymerizer, to which propylene and hydrogen were subsequently fed to further conduct polymerization while keeping the internal temperature at 70° C., the total pressure at 1.0 MPa, and the hydrogen/propylene concentration ratio in the vapor phase at 0.24. Thereafter, the polymerization slurry was fed to a first pressure drop tank.

Into the first pressure drop tank, which was regulated to 60° C. and 0.5 kg/cm$^2$G, was introduced 10.0 mol of tetraethylene glycol dimethyl ether per mol of the titanium in the solid catalyst (i.e., in an amount of 10.0 mol/mol-Ti).

The slurry discharged from the first pressure drop tank was fed to a third polymerizer.

d) Polymerization Step (II)

To the third polymerizer, which was maintained at 60° C., were fed propylene and ethylene at rates of 1.7 kg/hr and 0.5 kg/hr, respectively, and hydrogen at such a rate as to result in a vapor-phase hydrogen concentration of 1 mol %. The slurry which had left the third polymerizer was introduced into a second pressure drop tank, where the pressure of the slurry was lowered and the catalyst was deactivated with methanol. The resultant slurry was neutralized with an aqueous caustic soda solution and then subjected to water washing, powder separation, and a drying step. Thereafter, the product powder was recovered (about 8 kg/hr). The polypropylene/propylene-ethylene copolymer composition obtained was analyzed, and the results thereof are shown in Table 1.

e) Production of Injection-Molded Article

To 3.0 kg of the product powder obtained above were added 0.003 kg of a phenolic heat stabilizer and 0.003 kg of calcium stearate. These ingredients were mixed together by means of a high-speed agitation type mixer (note: Henschel mixer, trade name) at room temperature for 2 minutes. This mixture was granulated at 200° C. with an extrusion granulator having a screw diameter of 40 mm. Subsequently, the granules were formed into test pieces of a JIS shape with an injection molding machine at a molten-resin temperature of 210° C. and a mold temperature of 40° C. The test pieces were conditioned by holding the same in a room having a humidity of 50% and a temperature of 23° C. for 72 hours to obtain samples for mechanical-property evaluation. The results of the evaluations are shown in Table 2.

Example 2

Polymerizations were conducted in the same manner as in Example 1, except that two organosilicon compounds consisting of dicyclopentyldimethoxysilane and propyltriethoxysilane were used in place of the diisopropyldimethoxysilane in the catalyst system used in Example 1. The results are shown in Tables 1 and 2.

Examples 3 to 6

The same catalyst and polymerization methods as in Example 1 were used to synthesize various copolymer compositions while changing the ethylene/propylene proportion and the hydrogen concentration according to the process of the present invention. Properties of the compositions were determined. The results are shown in Tables 1 and 2.

Comparative Example 1

The same procedure as in Example 1 was conducted, except that in the catalyst used in Example 1, the solid catalyst component was replaced with the reduction type catalyst described in the Example 1 of Unexamined Published Japanese Patent Application No. 58-201816, and the triethylaluminum and the diisopropyldimethoxysilane were replaced with diethylaluminum chloride and methyl p-toluate, respectively. The results are shown in Tables 1 and 2.

Comparative Example 2 to 4

The same procedure as in Example 1 was conducted, except that the polymerization conditions used in Example 1 were changed as shown in Table 1. The results are shown in Tables 1 and 2.

TABLE 1

| | Polymerization Step (I) | | | | Polymerization Step (II) | | | |
|---|---|---|---|---|---|---|---|---|
| | Polymer proportion (wt %) | MFR (I) (g/10 min) | Density (g/cm³) | β (%) | Polymer proportion (wt %) | MFR (II) (g/10 min) | C3/C2 (wt % (ratio)) | log (MFR (1)/ MFR (II)) |
| Ex. 1 | 90 | 96 | 0.90 | 1.39 | 10 | 0.001 | 60/40 | 5.0 |
| Ex. 2 | 90 | 93 | 0.90 | 1.38 | 10 | 0.001 | 60/40 | 5.0 |
| Ex. 3 | 90 | 99 | 0.90 | 1.38 | 10 | 0.001 | 60/40 | 5.0 |
| Ex. 4 | 90 | 71 | 0.90 | 1.50 | 10 | 0.00001 | 60/40 | 6.9 |
| Ex. 5 | 94 | 98 | 0.90 | 1.38 | 6 | 0.0001 | 60/40 | 6.0 |
| Ex. 6 | 90 | 89 | 0.90 | 1.40 | 10 | 0.0001 | 75/25 | 5.9 |
| Comp. Ex. 1 | 90 | 95 | 0.90 | 1.11 | 10 | 0.001 | 60/40 | 5.0 |
| Comp. Ex. 2 | 90 | 96 | 0.90 | 1.39 | 10 | 0.0007 | 90/10 | 5.1 |
| Comp. Ex. 3 | 90 | 94 | 0.90 | 1.39 | 10 | 0.0007 | 10/90 | 5.1 |
| Comp. Ex. 4 | 50 | 95 | 0.90 | 1.38 | 50 | 0.002 | 60/40 | 4.7 |

TABLE 2

| | Whole Polymer Composition | | |
|---|---|---|---|
| | MFR (g/10 min) | Flexural modulus (MPa) | Izod impact strength (J/m, 23° C.) |
| Example 1 | 29 | 1580 | 99 |
| Example 2 | 30 | 1580 | 82 |
| Example 3 | 31 | 1589 | 85 |
| Example 4 | 15 | 1616 | 230 |
| Example 5 | 43 | 1598 | 80 |
| Example 6 | 23 | 1616 | 95 |
| Comparative Example 1 | 30 | 1110 | 70 |
| Comparative Example 2 | 29 | 1349 | 30 |
| Comparative Example 3 | 29 | 1252 | 45 |
| Comparative Example 4 | 0.4 | 500 | 400 |

Possibility of Industrial Application

As demonstrated also in the Examples given above, the polypropylene/propylene-ethylene copolymer composition of the present invention has high rigidity and high toughness despite its high melt flow rate.

Furthermore, according to the production process of the present invention, polymerization steps can be carried out successively and compositional control is easy. It has hence become possible to provide a copolymer composition reduced in product unevenness.

What is claimed is:

1. A polypropylene/propylene-ethylene copolymer composition having a melt flow rate (ASTM D-1238; the same applies hereinafter) of from 1 to 80 g/10 min obtained through:

a first stage (polymerization step (I)) in which propylene is polymerized in the presence of a highly stereoregular catalyst and hydrogen to produce a propylene polymer having a melt flow rate in the range of from 15 to 99 g/10 min and a tie molecule volume content (β), as obtained from an oriented sample and defined by $$\beta = (1-0.01Xc)E/(41-0.01Xc \cdot E)$$

wherein Xc: degree of crystallization (%); and
E (GPa): modulus of elasticity, of 1.38% or higher in an amount of from 60 to 95% by weight based on the total amount of the composition to be finally obtained; and a second stage (polymerization step (II)) in which ethylene and propylene are subsequently fed to the product of the first stage in such a proportion as to result in an ethylene content of from 20 to 80% by weight to produce a propylene-ethylene copolymer in an amount of from 5 to 40% by weight based on the total amount of the composition to be finally obtained.

2. The polypropylene/propylene-ethylene copolymer composition of claim 1, wherein the common logarithm of the ratio of the melt flow rate of the propylene polymer obtained in polymerization step (I) (MFR (i)) to the melt flow rate of the propylene-ethylene copolymer obtained in polymerization step (II) (MFR (ii)), i.e., the common logarithm of MFR (i)/MFR (ii), is from 2 to 9.

3. The polypropylene/propylene-ethylene copolymer composition of claim 1, wherein the common logarithm of the ratio of the melt flow rate of the propylene polymer obtained in polymerization step (I) (MFR (i)) to the melt flow rate of the ethylene-propylene copolymer obtained in polymerization step (II) (MFR (ii)), i.e., the common logarithm of MFR (i)/MFR (ii), is from 4 to 7.

4. The polypropylene/propylene-ethylene copolymer composition of claim 1, which has a melt flow rate of from 20 to 30 g/10 min.

5. The polypropylene/propylene-ethylene copolymer composition of claim 1, which has a melt flow rate of from 40 to 80 g/10 min.

6. The polypropylene/propylene-ethylene copolymer composition of claim 1, wherein the propylene polymer is a propylene polymer which consists of repeating units represented by the following general formula (1)

(1)

and has a number-average molecular weight of from 10,000 to 60,000, a density of from 0.90 to 0.92 g/cm³, and a tie molecule volume content (β) of 1.38% or higher.

(1)

7. A process for producing a polypropylene/propylene-ethylene copolymer composition having a melt flow rate (ASTM D-1238; the same applies hereinafter) of from 1 to 80 g/10 min which comprises:

a first stage (polymerization step (I)) in which a highly stereoregular catalyst is used to polymerize propylene in the presence of the highly stereoregular catalyst and hydrogen to produce a propylene polymer having a melt flow rate in the range of from 15 to 99 g/10 min and a tie molecule volume content (β), as obtained from an oriented sample and defined by $$\beta = (1 - 0.01 Xc) E / (41 - 0.01 Xc \cdot E)$$

wherein Xc: degree of crystallization (%); and

E (GPa): modulus of elasticity, of 1.38% or higher in an amount of from 60 to 95% by weight based on the total amount of the composition to be finally obtained; and a second stage (polymerization step (II)) in which ethylene and propylene are subsequently fed to the product of the first stage in such a proportion as to result in an ethylene content of from 20 to 80% by weight to produce a propylene-ethylene copolymer in an amount of from 5 to 40% by weight based on the total amount of the composition to be finally obtained.

* * * * *